US005706711A

United States Patent [19]

Ito

[11] Patent Number: 5,706,711

[45] Date of Patent: Jan. 13, 1998

[54] PUNCH DRIVE CONTROL APPARATUS

[75] Inventor: Shunitsu Ito, Ichinomiya, Japan

[73] Assignee: Murata Kikai Kabushiki Kaisha, Kyoto, Japan

[21] Appl. No.: 524,374

[22] Filed: Sep. 6, 1995

[30] Foreign Application Priority Data

Oct. 4, 1994 [JP] Japan .................................... 6-266236

[51] Int. Cl.[6] .............................. B26D 5/00; G05B 19/18

[52] U.S. Cl. ................................ 83/74; 83/76.7; 83/76.9; 83/630; 83/368; 83/530; 364/474.02

[58] Field of Search .............................. 83/75, 76.1, 76.6, 83/76.7, 76.8, 76.9, 543, 628, 629, 630, 632, 360, 361, 363, 364, 368, 525, 640, 530, 527, 75.5; 72/451; 100/43, 48, 257; 173/6, 10, 176; 364/474.02, 474.19

[56] References Cited

U.S. PATENT DOCUMENTS

| | | | |
|---|---|---|---|
| 3,720,125 | 3/1973 | Scott | 83/525 X |
| 3,858,471 | 1/1975 | Valente | 83/527 X |
| 3,919,907 | 11/1975 | Kindgren | 83/368 X |
| 4,272,812 | 6/1981 | Svensson | 83/76.8 X |
| 4,292,825 | 10/1981 | Morooka et al. | 72/8 X |
| 4,534,249 | 8/1985 | Smith | 83/525 X |
| 4,538,493 | 9/1985 | Perazzolo et al. | 83/530 X |
| 4,653,365 | 3/1987 | Takasaki et al. | 83/76.7 X |
| 5,069,060 | 12/1991 | Ishii | 72/443 X |
| 5,090,282 | 2/1992 | Ruesch | 83/76.7 X |
| 5,115,735 | 5/1992 | Gloe et al. | 100/43 X |
| 5,136,521 | 8/1992 | van Daalen et al. | 364/474.02 |
| 5,176,054 | 1/1993 | Capps | 83/13 X |
| 5,199,338 | 4/1993 | Schorn et al. | 83/368 X |
| 5,231,860 | 8/1993 | Tsuruta et al. | 72/21 X |
| 5,289,096 | 2/1994 | Takeda | 318/560 |

FOREIGN PATENT DOCUMENTS

| | | | |
|---|---|---|---|
| 2545764 | 4/1977 | Germany | 83/72 |
| 0062788 | 5/1977 | Japan | 83/368 |
| 0126589 | 11/1978 | Japan | 83/525 |
| 0019319 | 1/1987 | Japan | 83/368 |
| 0255299 | 10/1990 | Japan | 100/43 |
| 0216299 | 9/1991 | Japan | 100/43 |
| 406198596 | 7/1994 | Japan | 83/360 |

*Primary Examiner*—Rinaldi I. Rada
*Assistant Examiner*—Boyer Ashley
*Attorney, Agent, or Firm*—Armstrong, Westerman, Hattori, McLeland & Naughton

[57] ABSTRACT

A control apparatus which increases a hit rate, stabilizes a punch process, and makes use of a small motor. Such control apparatus is applicable to a punch drive apparatus that drives a punch tool by a servomotor via a ram and a toggle system. Such a structural arrangement includes a memory that memorizes a ram speed curve line from when the servomotor starts rotating to when the ram achieves a fixed speed; another memory that memorizes a surface height position of a sheet metal; and calculating device that calculates the lowest height of the ram at the aforementioned fixed speed when the punch tool reaches the surface of the sheet metal, and then sets a raised stand-by position of the ram. Such raised stand-by position is set in a ram shaft control device having the servo-controller.

3 Claims, 5 Drawing Sheets

PUNCH DRIVE CONTROL APPARATUS

FIELD OF THE INVENTION

This invention is related to punch drive control apparatus for a toggle style punch press driven by a servomotor.

BACKGROUND OF THE INVENTION

Previous mechanical punch presses transmitted the rotation of a flywheel rotating at a fixed speed to a crank system via a clutch brake. This was then converted to a lifting movement of a ram but the speed could not be changed mid-stroke. A speed change mid-stroke while noise prevention and high speed processing is also possible, is in great demand. A hydraulic punch press has been realized but has a high cost due to the hydraulic device.

Therefore, the applicant of this invention proposes a device which lifts the ram via a toggle system and has a servomotor as a drive source e.g. Japanese patent application Hei 6-157971.

Due to this, as a servomotor is used, position control and speed control etc can be easily carried out. Therefore, in order to raise the hit rate, it was thought that the stand-by position of the ram must be set lower than the top dead center. However, if the stand-by position was set to a position close to the surface of the sheet metal, a punch process would be carried out while the ram was still accelerating and therefore the power necessary for punching would be insufficient due to the power necessary for acceleration of the ram, and a stable punch process could not be carried out.

SUMMARY OF THE INVENTION

It is a primary object of this invention to provide a punch drive control apparatus that is able to increase the hit rate, carry out a stable punch and reduce the size of the motor.

This invention will be explained together with the figures corresponding to the embodiments.

This invention is applicable to a punch drive apparatus which lifts a punch tool (4) by a servomotor (12) via a toggle system (8) and a ram (6).

On this construction, the following are arranged, a means (48) that memorizes the ram speed curve of when the ram (6) reaches its fixed speed (Vc) from when the aforementioned motor (12) starts rotating, a means (47) that memorizes the surface height position (SH) of the sheet metal (W), and a means (52) that calculates the lowest height position (LH) of the ram (6) which is at the aforementioned fixed speed (Vc) from the aforementioned surface height position (SH) and the aforementioned speed curve when the punch tool (4) reaches the sheet metal surface and then sets the raised stand-by position (HH) of the ram (6).

Also, on the aforementioned construction, a means (50) that memorizes the punch torque($\tau$3) my be arranged and also a means that judges whether the sum of this punch torque ($\tau$3) and the acceleration torque ($\tau$2) necessary for acceleration of the aforementioned ram (6) has reached a predetermined torque level ($\tau$L) or not and then, if it has not been reached, sets the raised stand-by position (HH) of the ram (6) to a position lower than lowest height position (LH) of the ram (6) at fixed speed (Vc). The memory means (50) of the punch torque ($\tau$3) can even act as a device for memorizing the punch torque corresponding to various types of sheet metal and punch tools.

Furthermore, a torque detection means (46) of the aforementioned servomotor (12) is arranged and it is preferable to arrange a means (51) that calculates the punch torque ($\tau$3) from the torque detection during the punching process and then set this in the memory means (50) of the aforementioned punch torque.

Due to this structure, the ram (6) stands by in the raised stand-by position (HH) calculated by the raised stand-by position calculating mean (52), then starts lowering from this raised stand-by position (HH) and punching of the sheet metal (W) is carried out. At this time, the raised stand-by position (HH) is set as the position at fixed speed (Vc) when the punch tool (4) reaches the surface of the sheet metal (W) and thus punching occurs in the state where the ram (6) has obtained the fixed speed (Vc). Due to this, there is no load on the servomotor (12) the simultaneous application of the acceleration torque ($\tau$2) of the ram (6) and the punch torque ($\tau$3), all the torque necessary for punching can be minimized and a stable punch can be carried out by a low torque servomotor (12). Also, the raised stand-by position (HH) can be set to a position as low as possible within the range for stable punching and thus the hit rate can be increased.

In the case where the aforementioned light load time stand-by position calculation means (53) and the punch torque memory means (50) are arranged, when there need only be a small punch torque ($\tau$3) as for example when the sheet metal (W) is thin or a small punch hole is to be processed, the raised stand-by position (HH) of the ram (6) is set to a low position. Due to this, punching occurs mid-acceleration but as the punch torque ($\tau$3) is small, there is no excessive load on the servomotor (12) and stable punching can be carried out even during acceleration. In this way, at times of light load, the hit rate can be increased even more by the low setting of the raised stand-by position (HH).

Also, in the case where a means (51) that calculates the punch torque ($\tau$3) from the torque detection during the punching process and then set this in the memory means (50) of the punch torque ($\tau$3) is arranged, there is no need for a manual input operation of the calculation of the punch torque ($\tau$3) and moreover, an exact punch torque ($\tau$3) can be set. For example, in the case of continuous processing of the same punch hole in the same sheet metal (W), in the beginning after the fixed speed (Vc) has been reached, the raised stand-by position (HH) for punching is set and for the second punch after this, in the light load case, the increasing of the hit rate is done automatically at a low raised stand-by position (HH) as for when punching is occurring mid-acceleration.

DETAILED DESCRIPTION OF THE PREFERRED EMBODIMENT

The embodiment of this invention will be explained based on FIGS. 1 to 8.

Figure 4:
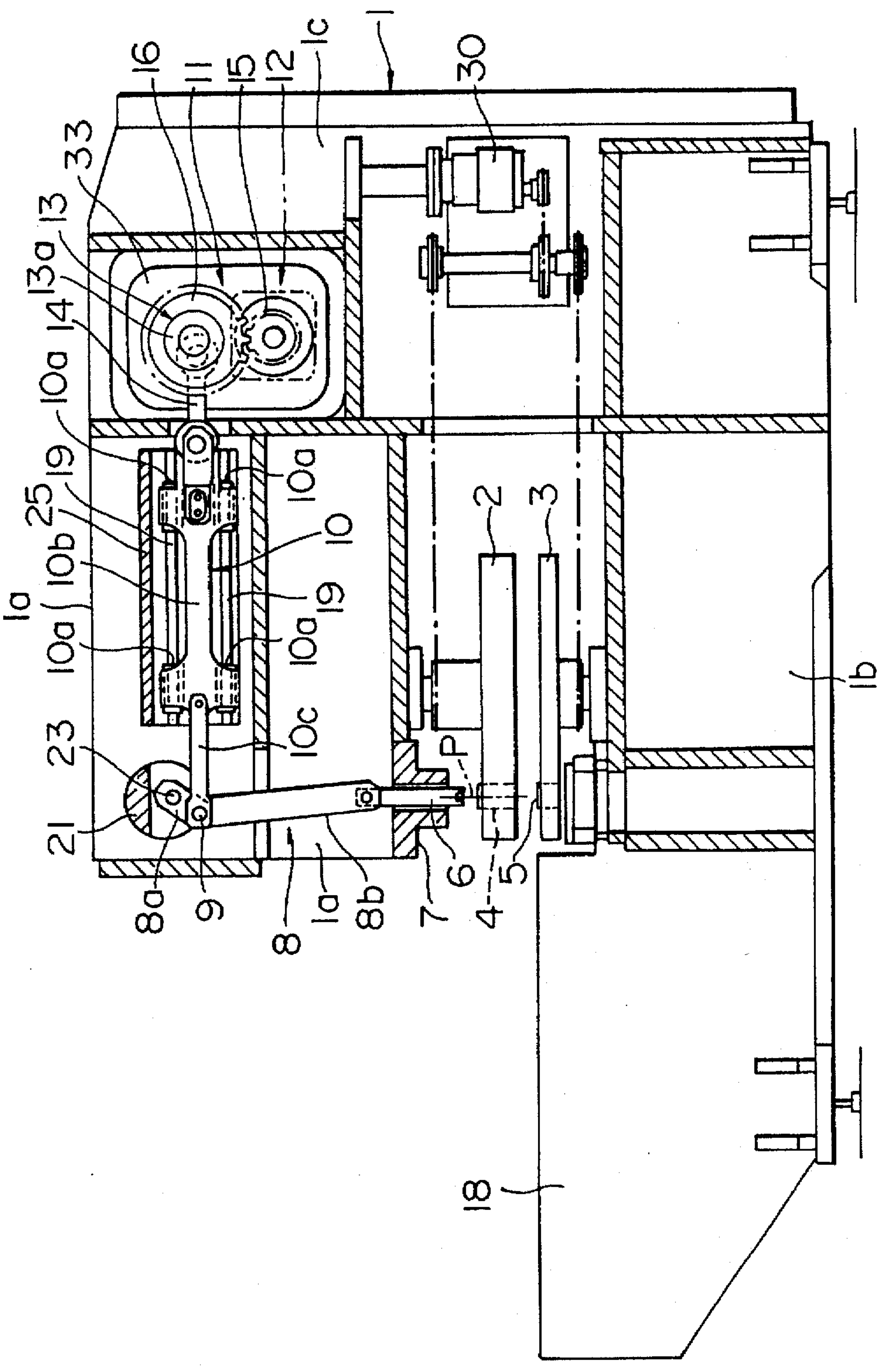
FIG. 4 is a vertical sectional side elevation of the toggle style punch press applicable to same control apparatus.
Figure 5:
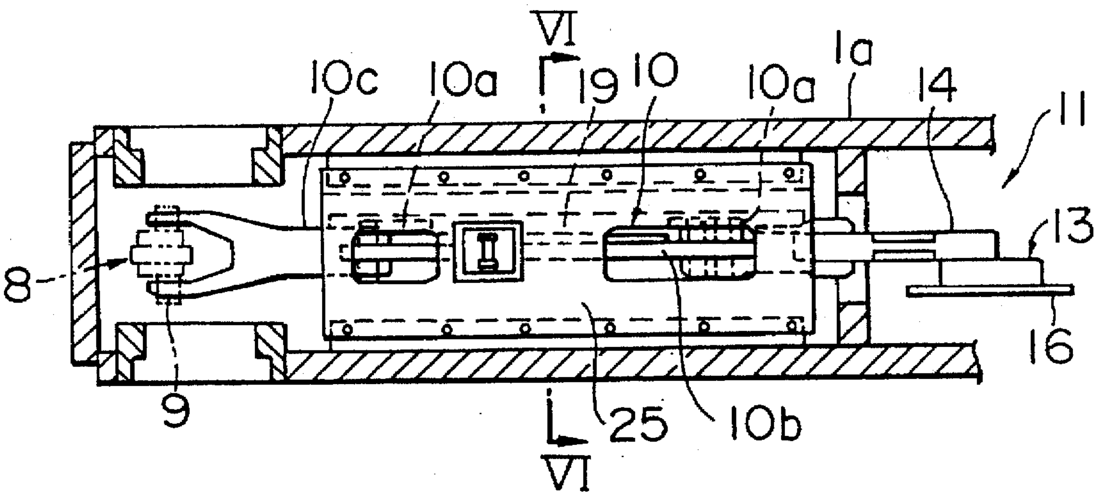
FIG. 5 is a partial sectional plan elevation of same punch press.

First of all, the structure of this punch press applied to this punch drive control apparatus will be explained. FIG. 4 is a vertical sectional side elevation of the toggle style punch press. The side of the press frame (1) is formed in a "C" shape and the upper turret (2) and lower turret (3) are positioned respectively about the same axis on the upper frame (1*a*) and the lower frame (1*b*). The upper and lower turrets (2,3) have respectively a plurality of punch tools (4) and die tools (5) arranged in a circle and are rotated in synchronicity via a chain system by a motor (30) positioned in the throat part (1*c*) of the press frame (1). Each punch tool (4) is driven linked to the ram (6) when the punch processing position (P) is selected. The ram (6) is supported by the upper frame (1*a*) via the guide member (7) so it can move freely up and down and is driven by the toggle system (8) that flexes. The plate sheet metal is gripped by the sheet metal holder of the sheet metal transport system (not shown in the drawing) and is transported to the punch processing position (P) on the table (18).

Figure 1:
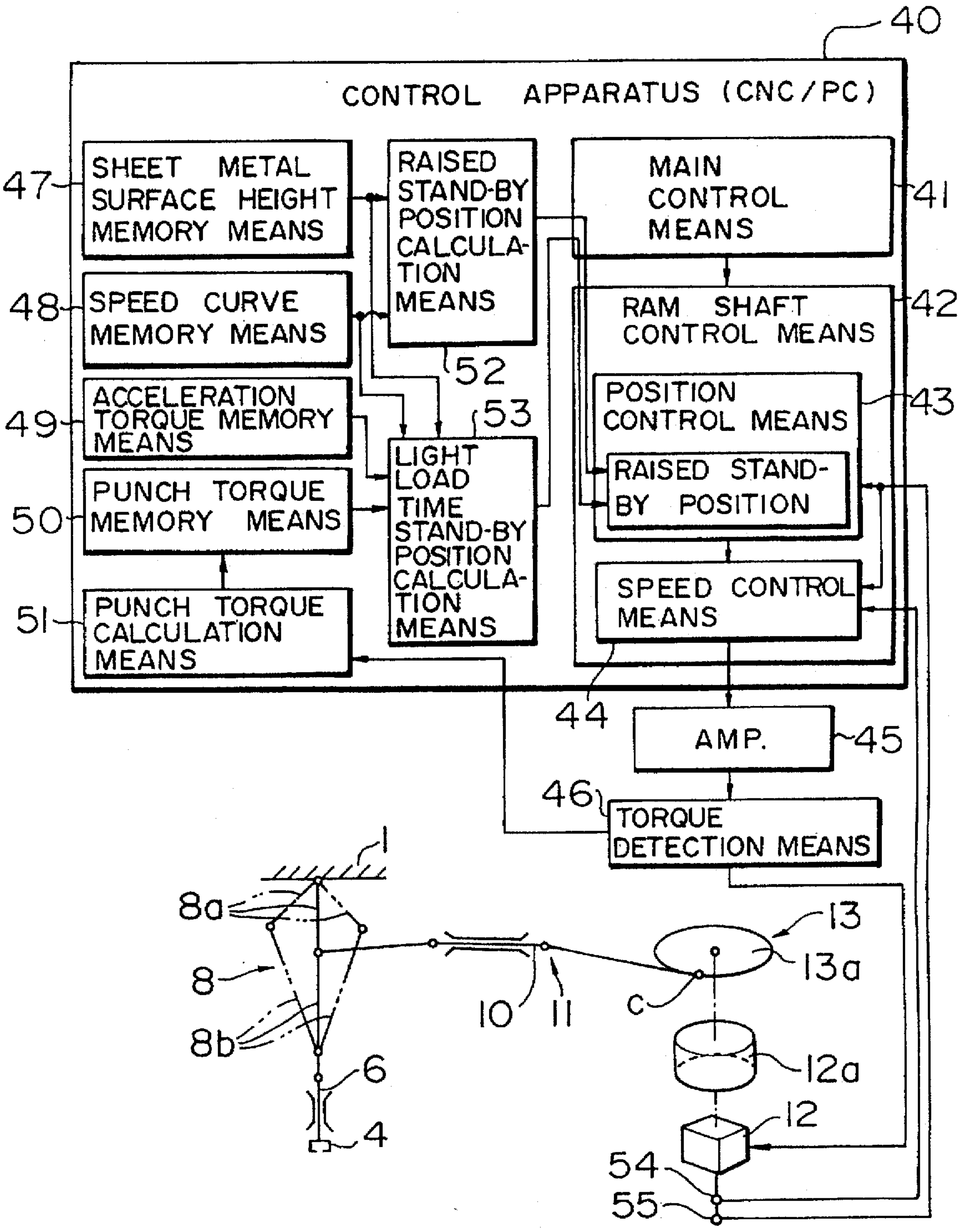
FIG. 1 is an explanatory diagram of the conceptual composition of the punch drive control apparatus relating to the embodiment of this invention.

As shown in FIGS. 1 and 4, the short upper toggle link (8*a*) and the long lower toggle link (8*b*) can freely flex by the linkage of a pin (9) to form the toggle system (8) and are flexibly driven by the movement member (10) which freely moves back and forth in a horizontal direction. The lower end of the lower toggle link (8*b*) of the toggle system (8) is connected to the upper end of the ram (6) by a freely rotating pin. The upper end of the upper toggle link (8*a*) rotates freely around the rotating support shaft (23) and is supported by the upper frame part (1*a*) via the support point member (21).

The movement member (10) is driven by the servomotor (12) which is the drive source via the crank system (13) which converts a rotational movement to a back and forth straight line movement. The transmission system (11) is comprised of the movement member (10) and the crank system (13).

Figure 6:
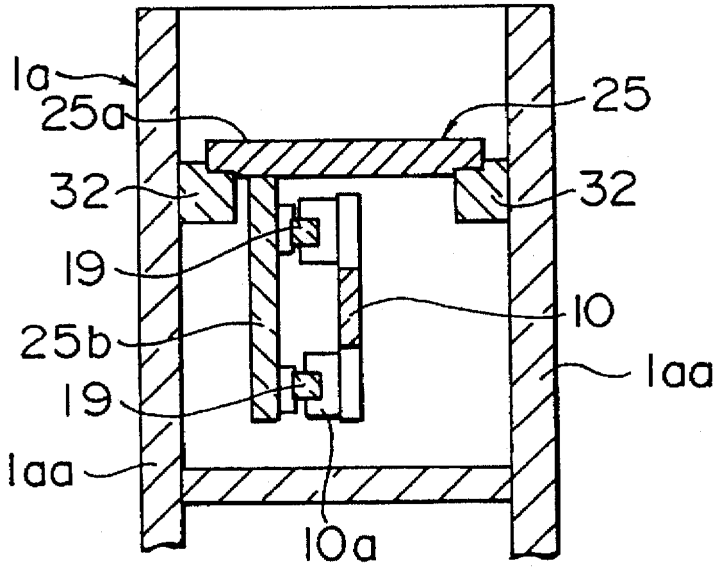
FIG. 6 is a sectional front elevation taken along the line VI—VI in FIG. 5.

A moveable lever (10*c*) is linked to the end of the lever-shaped movement member main body (10*b*) so that it can rotate upwards and downwards to form the movement member (10) and the two pronged end part (refer to FIG. 5) of the moveable lever (10*c*) is linked to pin (9) of the toggle system (8) so that it can freely rotate upwards and downwards. The high and low positioning of the flex part associated with the flexing movement of the toggle system (8) is absorbed by the up-down movement of the aforementioned moveable lever (10*c*). The movement member main body (10*b*) is supported so as to be freely moveable by the two guide rails (19,19) positioned horizontally above and below each other on the support frame (25) within the upper frame (1*a*) via the guide member (10*a*) formed from a linear type bearings etc. As shown in FIG. 6, the support frame (25) comprises the horizontal plate (25*a*) and the vertical plate (25*b*) connected on one side to the lower surface of the horizontal plate (25*a*). Both sides of the horizontal plate (25*a*) are fixed on top of the rungs (32,32) arranged on the inside surface of both side plates (1*aa*, 1*aa*) of the upper frame (1*a*).

As shown in FIG. 4, the crank system (13) has an arrangement whereby a round crank plate (13*a*) which is the rotating member is arranged on the upper part of the throat portion (1*c*) of the frame (1) in such a way axis center is a vertical sideways facing shape against the frame side and one end of the link rod (14) is linked to the link point (c) on the off-center position of the crank plate (13*a*) so that it is able to freely rotate. The other end of the link rod (14) is linked to the base end of the movement member main body (10*b*) so that it is able to freely rotate. The rotation shaft of the crank plate (13*a*) is supported by the fixing plate (33) affixed to the open part of one side of the side plates of the throat part (1*c*) via the bearing (not shown in the drawing) so that it is able to rotate freely. The aforementioned servomotor (12) is positioned on the fixing plate (33) directly below the shaft receptacle of the crank plate (13*a*). The servomotor (12) has an arrangment of a speed reducer (12*a*) and the rotation caused by the output of that speed reducer (12*a*) is transmitted to the crank plate (13*a*) by the meshing of the output gear (15) with the input gear (16) of the crank plate (13*a*). The speed reduction ratio of the speed reducer (12*a*) is set to 11:1 for example.

Next, the control systems will be explained with FIGS. 1 to 3.

Control apparatus (40) is a means that controls the entire punch press and is prepared of a computer type numerical control apparatus, a programmable controller and a servo-controller for each axis. Partitioned in the control apparatus (40) are the main control means (41), the ram shaft control means (42), the raised stand-by position calculation means (52), the light load time stand-by position calculation means (53), the sheet metal surface height memory means (47), the speed curve memory means (48), the acceleration torque memory means (49), the punch torque memory means (50) and the punch torque calculation means (51). The main control means (41) is a means that reads the process program and outputs the drive instruction for each means and that also carries out the processing that forwards the sequence instructions to the programmable controller. It also carries out the function that gives an instruction that instructs the ram shaft control means (42) to carry out a punch action every punch.

The ram shaft control means (42) is a means that controls the servomotor (12) used for punch driving and is comprised of a servo controller of a software servo etc formed from a computer which is a control program or that execution means. The ram shaft control means (42) contains the position control means (43) and speed control means (44) and the output of the speed control means (44) is entered into the servomotor (12) via the amp (45) and the torque detection means (46). The servomotor (12) is either linked to the speed detection device (54) like a speed generator or pulse generator ere and the position detection device (55) like the rotary encoder etc or is arranged as one unit. An ammeter is used for the torque detection means (46).

The position control means (43) contains the setting part for the raised stand-by position (HH) and while observing the detection values of the position detector (55), is a means that controls the servomotor (12) by a closed loop in such a way that the ram (6) is raised to the set raised stand-by position. The raised stand-by position is set as the rotation angle of the servomotor (12). The speed control means (44) is a means that sets the speed curve of a predetermined stroke of the ram (6) moving from the top dead center, through the bottom dead center and then back to the top dead center corresponding to the rotation angle of the servomotor (12) and has a control function that causes movement along the aforementioned speed curve by a closed loop while observing the detection values of the position detector (55) and speed detector (54) of the servomotor (12). Further, concerning the speed of the ram (6), the rotation The speed of the servomotor (12) forms a predetermined related speed curve through the toggle system (8) and the crank system (13).

The sheet metal surface height memory means (47) is a means that memorizes the positional height of the surface of the sheet metal (W) positioned on the table (18) and can be carried out so that the value of the plate thickness (t) of the sheet metal (W) in the surface height position based on the die height position (DH) is memorized or the height based on the bottom dead center of the ram (6) is memorized. In the former ease, it is the sum of the die height position (DH) and the plate thickness (t). The sheet metal surface height memory means (47) can be set by forwarding the plate thickness (t) recorded in the processing program from the main control means (41) or by another input setting.

The speed curve memory means (48) is a means that memorizes the ram speed curve of when the ram (6) reaches fixed speed from the start of revolution of the servomotor (12) and specifically the set speed curve is set by the speed control means (44) on the ram shaft control means (42). For this embodiment as shown in FIG. 2, after this speed curve has accelerated at a fixed rate and reached the fixed speed (Vc), it is set to a curve that carries out trapezoid control that decelerates at a fixed rate. Further, this speed curve is usually fixed at times of acceleration and deceleration but the length of the fixed speed (Vc) segment differs corresponding to the raised stand-by position (HH). The speed curve memory means (48) can be a means which memorizes after converting the speed of the ram (6) into the rotation speed of the servomotor (12).

The raised stand-by position calculation means (52) calculates the lowest height position (LH) of the ram (6) at fixed speed when the the punch tool (4) has reached the sheet metal surface, from the surface height position (SH) memorized by the sheet metal surface height memory means (47) and the set speed curve of the speed curve memory means (48) and is a means that sets the height position where the spare height (α) is added to the aforementioned lowest height position (LH), as the raised stand-by position (HH) of the ram (6) into the position control means (43) of the ram shaft control means (42). In other words, regardless of the calculation process, the raised stand-by position calculation means (52) sets the raised stand-by position (HH) to the height which is the sum of the die bright position (DH), sheet metal plate thickness (t), acceleration height (ah) which is from the start of rotation to the fixed speed and the spare height (α) upward from the bottom dead center (BDC).

Figure 8:
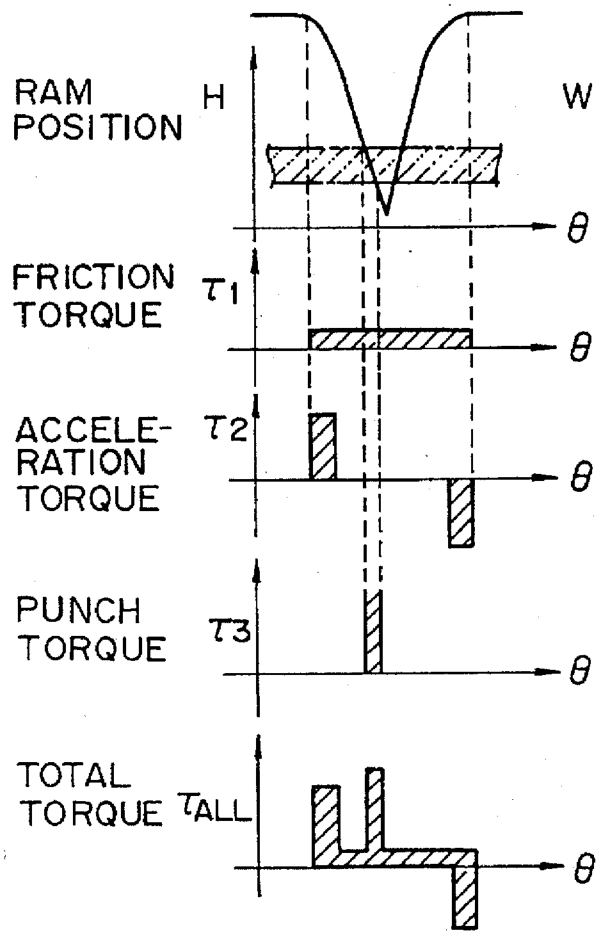
FIGS. 8 are explanatory diagrams showing the relationship between crank angle and each torque.

The punch torque memory means (50) is a means that sets the punch torque (τ3) being the torque necessary for shearing of the sheet metal (W) by the punch tool (4) from the total of all the torque necessary when punching. In short, as shown in FIG. 8, the total torque (τall) when punch processing is the sum of the friction torque (τ1) caused by the friction of each moving part of the ram (6), the acceleration torque (τ2) caused by the necessary acceleration and deceleration and the punch torque (τ3). This friction torque (τ1) is memorized by the punch torque memory means (50). The punch torque memory means (50) can be a means that only memorizes one punch torque data and also a means that memorizes various differing punch torque data of sheet metal types and punch tool types and then chooses the combination of tool type and plate thickness.

The punch torque calculation means (51) calculates the punch torque (τ3) from detection values formed of electric current values of the torque detection means (46) when a punch process is actually being carried out and is a means that sets this in the appointed memory area of the punch torque memory means (50).

The light load time stand-by position calculation means (53) determines whether the sum of the punch torque (τ3) and the acceleration torque (τ2) reaches the predetermined torque value (τL) or not and in the case where it does not reach the predetermined torque value (τL), is a means that sets the raised stand-by position (HH) lower than the lowest height position (LH) of the ram (6) which is at the aforementioned fixed speed (Vc). In this case, the raised stand-by position (HH) is set at a positional height where the spare height (α) is added to the surface height position (SH) of the sheet metal (W). The predetermined torque value (τL) is set to a value where stable punching can be carried out corresponding to the capacity of the servomotor (12) and the punch drive apparatus system etc.

Next, the movements of the aforementioned structure will be explained.

Due to the rotation of the servomotor (12), the crank plate (13*a*) is rotated via a speed reducer (12*a*). The rotation of the crank plate (13*a*) is converted into a straight line movement of the movement member (10) and the toggle system (8) is flexibly driven by that movement. Due to this flex movement, the ram (6) rises and drops and a punch process is carried out by the punch tool (4).

Figure 7:
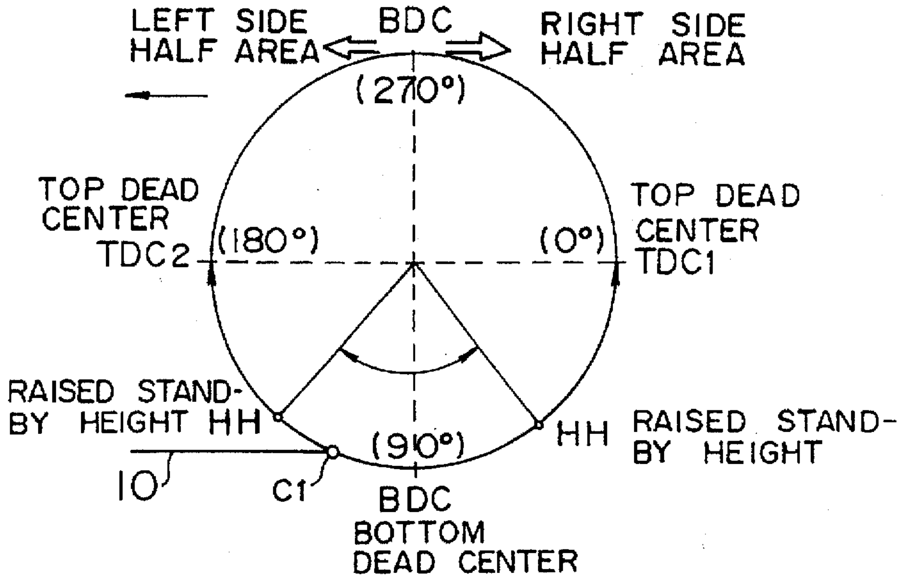
FIG. 7 is an explanatory diagram showing the relationship between crank angle and ram position.

In this case, as in FIG. 7 showing the relationship between the crank angle and ram position, if the crank plate (13*a*) is rotated once, when the linking point (C1) of the movement member (10) on the crank plate (13*a*) is in the position farthest from the toggle system (8) (this position is known as 0°) or in the nearest position to the toggle system (8) (180°), the ram (6) is positioned at top dead center (TDC), and when it is positioned at these points (90°,270°), the ram (6) is positioned at bottom dead center (BDC).

In normal punch processing, the crank plate (13*a*) is not rotated one time but rotates in alternate directions to the raised stand-by position (HH) on both sides of the rotation corresponding to the bottom dead center (BDC) of the ram (6) due to the control of the servomotor (12) by the position control means (43).

The raised stand-by position (HH) can be at the top dead center (TDC) but by setting it lower, the rotation range of the crank plate (13*a*) can be narrower and the hit rate can be raised. The raised stand-by position (HH) is calculated from the surface height position (SH) of the sheet metal (W) and necessary acceleration height (ah) as mentioned previously and is set in the position control means (43) by the raised stand-by position calculation means (52).

Thus by setting the raised stand-by position (HH) in this way, the ram (6) stands by in the set raised stand-by position (HH) and carries out punching of the sheet metal (W) starting from this position. At this time, the raised stand-by position (HH) is set to the position at fixed speed (Vc) when the punch tool (4) reaches the sheet metal surface and punching is carried out with the ram (6) at fixed speed (Vc). Because of this, there is no load on the servomotor (12) by simultaneous application of punch torque (τ3) and acceleration torque (τ2) of the ram (6) and the total torque (τall) necessary for punching can be minimized and a stable punch can be carried out by a servomotor with a small torque.

Figure 2:
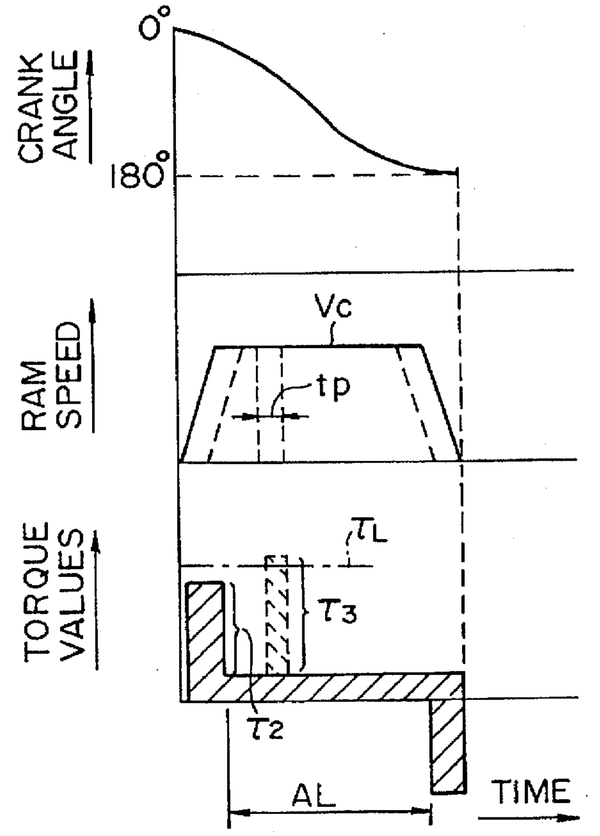
FIG. 2 are explanatory diagrams showing the relationship between time and crank angle, ram speed, torque values.
Figure 3:
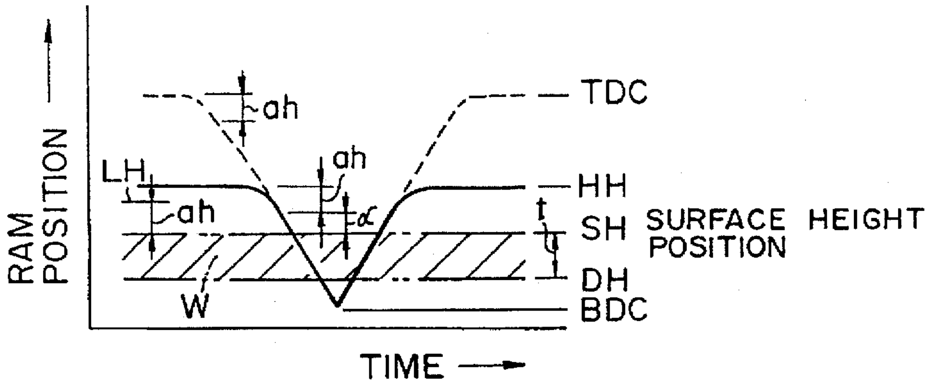
FIG. 3 is an explanatory diagram showing the relationship between time and ram position.

Furthermore, FIG. 2 shows the crank angle, the ram speed and the torque values in the case where the raised stand-by position (HH) is set at top dead center (TDC). In this case, the range where acceleration torque (τ2) is not caused is (AL) and as punching is carried out in this range, there is no additional acceleration torque (τ2) and punch torque (τ3). In the case where the raised stand-by position (HH) is set lower than the top dead center (TDC), the ram speed curve line is as shown by the broken line in the same FIG. 2 and the aforementioned range (AL) becomes narrower. (tp) shows the punching time.

When the sheet metal (W) is thin and when the punch torque (τ3) needs only be small when for example processing a small punch hole, the raised stand-by position (HH) of the ram (6) is set to a low position which is does not reach the height necessary for acceleration (ah) above the sheet metal surface. Due to this, punching occurs mid-acceleration and the acceleration torque (τ2) and punch torque (τ3) are applied having an effect on the servomotor (12). However, as the punch torque (τ3) is small, there is no overload on the servomotor (12) and a stable punch can be carried out even during acceleration. In this way, at times of light load, by setting the raised stand-by position to a low position, the hit rate can be substantially increased.

When the punch torque calculation means (51) functions, the punch torque (τ3) is calculated from the detected torque of the torque detection means (46) at times of punch processing and is set in the punch torque memory means (50). Due to this, it is no longer necessary to calculate the punch torque (τ3) and to manually carry out this operation etc. Moreover, an exact punch torque (τ3) can be set. Also, for example, in the case of processing of the same punch hole in the same sheet metal (W) continuously, in the beginning, after reaching fixed speed, the raised stand-by position (HH) is set in order to carry out punching and for the second punch after this, if it is a light load, an automatic increase in the hit rate can be carried out with a low stand-by position so as to carry out punching mid-acceleration.

On a control apparatus of a toggle type punch drive apparatus that is driven by a servomotor (12), as the control apparatus of this invention is comprised of a means (48) that memorizes the ram speed curve line from when the servomotor (12) starts rotating to when the ram (6) reaches the fixed speed (Vc), a means (47) that memorizes the surface height position (SH) of the sheet metal (W) and a means (52) that calculates the lowest height position (LH) of the ram (6) at the aforementioned fixed (Vc) speed when the punch tool (4) reaches the surface of the sheet metal (W) from the aforementioned surface height position (SH) and the aforementioned speed curve line, and then sets the raised stand-by position (HH) of the ram(6), the hit rate is increased, punch processing is stable and a small size motor can be used.

In the case of the invention of claim 2, as there is an arrangement of a memory means (50) of the punch torque (τ3) and a light load time stand-by position calculation means (53) that sets the raised stand-by position (HH) to a low position when the sum of the punch torque (τ3) and the acceleration torque (τ2) do not reach a predetermined torque value (τL), when processing thin plates or small punch holes, a substantial increase in the hit rate can be achieved with a low raised stand-by position so as to carry out punching mid-acceleration and moreover, at times of normal punch processing a stable punch can be carried out at a raised stand-by height where punching is carried out at fixed speed.

In the case of the invention of claim 3, as there is calculation of the punch torque (τ3) from the torque detection when punch processing and setting in the punch torque memory means (50), it is no longer necessary to calculate the punch torque (τ3) and to manually carry out this operation etc. Moreover, an exact punch torque (τ3) can be set.

While the invention has been particularly shown and described in reference to preferred embodiments thereof, it will be understood by those skilled in the art that changes in form and details may be made therein without departing from the spirit and scope of the invention.

What is claimed is:

1. A punching apparatus comprising:
- a punching tool;
- a ram connected to the punching tool;
- a servomotor operatively connected to the ram; and
- a punch drive control apparatus connected to the servomotor, wherein the punch drive control apparatus includes
  - a first means for memorizing a ram speed curve line from when the servomotor starts rotating to when the ram achieves a fixed speed;
  - a second means for memorizing a surface height position of a sheet metal; and
  - a third means for setting a raised stand-by position for the ram by calculating a lowest height of the ram from a surface of the sheet metal wherein the punch tool reaches the surface of the sheet metal by the time the ram reaches the fixed speed.

2. A punch drive control apparatus as in claim 1, wherein the punch drive control apparatus further comprises a fourth means for memorizing a punch torque, and a light load time stand-by position calculation means for judging whether a sum of a value of the punch torque and a value of a torque necessary for acceleration of the ram has reached a predetermined torque level or not and then setting a raised stand-by position of the ram to a position lower than the lowest height of the ram from the surface of the sheet metal, as calculated by the third means, if the sum has not reached the predetermined torque level.

3. A punch drive control apparatus as in claim 2, wherein the punch drive control apparatus further comprises a torque detection means of the servometer and a fifth means for calculating the punch torque from a detected torque during punch processing and for setting the calculated punch torque in the fourth memory means.

* * * * *